United States Patent
Nichols et al.

(10) Patent No.: US 8,978,123 B2
(45) Date of Patent: *Mar. 10, 2015

(54) WEB BASED SYSTEM THAT ALLOWS USERS TO LOG INTO WEBSITES WITHOUT ENTERING USERNAME AND PASSWORD INFORMATION

(71) Applicant: Springo Incorporated, San Francisco, CA (US)

(72) Inventors: Jonathan Nichols, San Francisco, CA (US); Krista Donaldson, San Francisco, CA (US)

(73) Assignee: Springo Incorporated, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,535

(22) Filed: Jul. 29, 2013

(65) Prior Publication Data

US 2013/0312075 A1 Nov. 21, 2013

Related U.S. Application Data

(63) Continuation of application No. 12/143,784, filed on Jun. 21, 2008, now Pat. No. 8,528,064.

(60) Provisional application No. 60/945,722, filed on Jun. 22, 2007.

(51) Int. Cl.
*H04L 29/06* (2006.01)
*G06F 21/41* (2013.01)

(52) U.S. Cl.
CPC ............ *H04L 63/0815* (2013.01); *G06F 21/41* (2013.01); *H04L 63/083* (2013.01);
(Continued)

(58) Field of Classification Search
CPC . G06F 21/62; G06F 21/6209; G06F 21/6218; H04L 9/0894
USPC .................................. 726/5, 6, 8, 18; 713/183
See application file for complete search history.

(56) References Cited

U.S. PATENT DOCUMENTS 6,496,855 B1 12/2002 Hunt et al.
7,490,242 B2 2/2009 Torres et al.
(Continued)

OTHER PUBLICATIONS

Office Action dated Sep. 29, 2011 for U.S. Appl. No. 12/143,784, 24 pages.

(Continued)

*Primary Examiner* — Edward Zee
(74) *Attorney, Agent, or Firm* — Amin, Turocy & Watson, LLP

(57) ABSTRACT

Internet user passwords are securely managed. A formation component can enable a user to create a master account on a web server, the master account comprising a master username and password. An access component can enable the user to access a plurality of password protected websites from a web browser or non-browser software application resident on the user's computing device when the user logs into the master account by entering the valid master username and password. A selection component can log the user into a website of the plurality of password protected websites when the user selects a hyperlink associated with the website, selects a linked image associated with the website, or selects the website from a pulldown list contained in a toolbar of a web browser. A display component can open a web browser or tab associated with the website.

16 Claims, 14 Drawing Sheets

(52) U.S. Cl.
CPC . *G06F2221/2107* (2013.01); *G06F 2221/2115* (2013.01); *G06F 2221/2117* (2013.01); *G06F 2221/2119* (2013.01); *G06F 2221/2143* (2013.01)
USPC .................................................. 726/8; 725/5

(56) References Cited

U.S. PATENT DOCUMENTS

| | | | |
|---|---|---|---|
| 8,528,064 B2* | 9/2013 | Nichols et al. | 726/8 |
| 2004/0158746 A1 | 8/2004 | Hu et al. | |
| 2005/0177731 A1* | 8/2005 | Torres et al. | 713/182 |
| 2006/0156026 A1* | 7/2006 | Utin | 713/183 |
| 2007/0006305 A1 | 1/2007 | Florencio et al. | |

OTHER PUBLICATIONS

Office Action dated Mar. 9, 2012 for U.S. Appl. No. 12/143,784, 23 pages.
Office Action dated Mar. 11, 2013 for U.S. Appl. No. 12/143,784, 19 pages.

* cited by examiner

WEB BASED SYSTEM THAT ALLOWS USERS TO LOG INTO WEBSITES WITHOUT ENTERING USERNAME AND PASSWORD INFORMATION

CROSS REFERENCE TO RELATED APPLICATIONS

This application is a continuation of U.S. patent application Ser. No. 12/143,784 filed Jun. 21, 2008 entitled "A WEB BASED SYSTEM THAT ALLOWS USERS TO LOG INTO WEB SITES WITHOUT ENTERING USERNAME AND PASSWORD INFORMATION" which claims the benefit of U.S. Provisional Application No. 60/945,722, filed on Jun. 22, 2007, and entitled "A WEB BASED SYSTEM THAT ALLOWS USERS TO LOG INTO WEBSITES WITHOUT ENTERING USERNAME AND PASSWORD INFORMATION," the entireties of each of which applications are incorporated herein by reference.

TECHNICAL FIELD

This disclosure relates generally to internet based systems, and in particular, but not exclusively, relates to web based systems that allow users to log into websites without entering username and password information.

BACKGROUND

The World Wide Web (commonly referred to as the Web) is a system of interlinked hypertext documents accessed via the Internet. With a Web browser, a user navigates between Web pages (also referred to as websites) using hyperlinks to access information including text, images, videos, and other multimedia.

Many websites require users to create accounts to access or exchange information via the websites. Once a user establishes an account, the user can log into the account to exchange information between the user's (e.g., client's) browser and a website's server(s) over the World Wide Web.

A typical Internet user has many different accounts on a multitude of websites of the World Wide Web. Conventional technology attempts to protect access to sensitive information exchanged through the World Wide Web by requiring simple password authentication, i.e., entry of a unique username and password. As a result, managing different usernames and passwords to access different websites has become a burden to Internet users. Internet users can manage this inconvenience in various ways, including writing sensitive information down on a piece of paper, clicking on a "Forgot Password" or similar link every time a log-in attempt fails, using one of many substandard conventional password management tools, or requesting that a new password be issued.

To log into a typical website from a browser, a user enters his username and password into textboxes on a login page and clicks on a "Log In" button or similar access feature. The browser inserts the username and password into a form object, encapsulates it into an HTTP POST request, and submits it to the website's server. The server authenticates the user, and then redirects the browser to a main page if the authentication is successful. If the user wants to log into other accounts associated with other websites, the user must enter a username and password associated with the other websites—thus, the user often becomes exasperated when he has to enter a username and password for each website he wants to access.

Conventional web browsers (e.g., Mozilla Firefox®) allow users to store various usernames and passwords to a local file when the users enter this information into a login form for the first time. For example, when a user returns to a website for which the browser previously stored a corresponding username and password, Firefox® automatically fills in the login form information (the password masked with asterisks), allowing the user to log in with one click without reentering username or password information. While saving passwords in this way is one means of locally managing passwords, there are several drawbacks: First, the user is limited to exclusively using the same browser on the same computing device in which the password information was stored—if a user wants to run a different browser on the same computer or use a different computing device, saved password information is inaccessible.

Second, because passwords and related login information are stored locally on a user's computer in a weak encrypted format, the passwords can be easily retrieved by an attacker, e.g., if an attacker gains access to the user's computer, the attacker can easily view all of the stored plaintext passwords by clicking the "Show Passwords" button in Firefox®. Although browsers like Firefox® allow users to lock locally stored passwords by using a master password, such functionality is not available by default. Most users are not savvy enough to realize the vulnerability of their username and password information and do not enable the browser password protection feature.

Moreover, conventional technology that relies on simple password authentication to protect sensitive information exchanged over the World Wide Web can be easily compromised. Third parties can easily intercept data transferred between a client's browser and a server over the World Wide Web because a web user is typically connected and/or routed to a web server through many different computers. Although secure sockets layer (SSL) protocol technology can be used to counteract such security threats, attackers can further acquire username and password information by a process known as phishing. Phishing involves sending an email to a large list of people, telling them that they need to log into a particular site for one reason or another. The attacker(s) include a hyperlink in the email that directs a user to a site that looks identical to the real site, but is hosted by the attacker(s). When the user enters his username and password into the fake site, the information is handed over to the attacker(s).

It is therefore desirable to have systems and methods for securely managing Internet user passwords while facilitating a more enjoyable Internet user experience.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
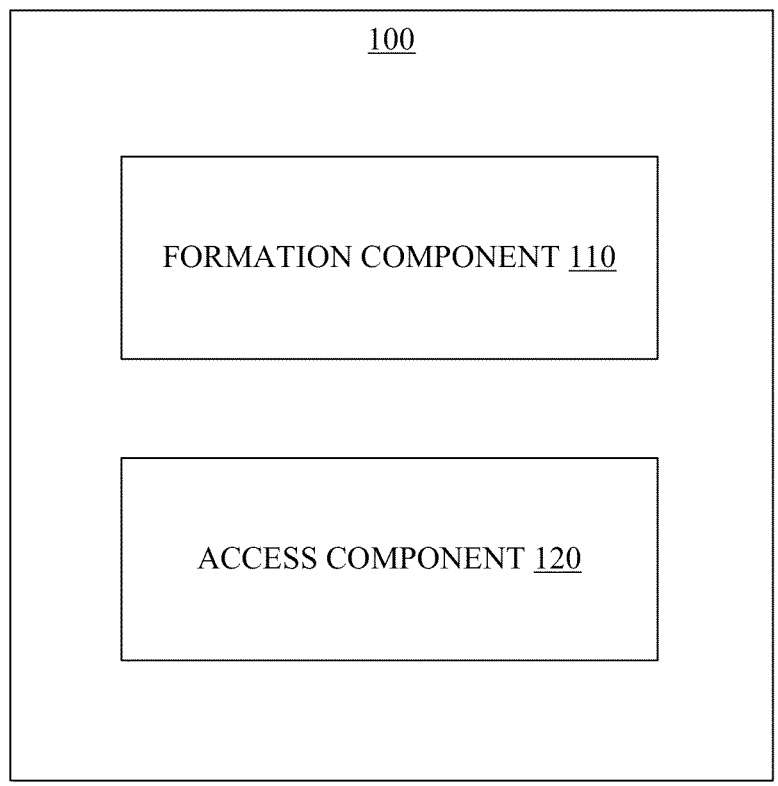
FIG. 1 is a demonstrative system for securely managing Internet user passwords while facilitating a more enjoyable Internet user experience, in accordance with an embodiment of the invention.

The claimed subject matter relates to systems and methods for facilitating efficient and secure management of usernames and passwords, enhancing Internet user interaction with the World Wide Web.

Conventional techniques for managing usernames and passwords burden Internet users because the Internet users must manage different usernames and passwords to access different password protected websites. Although conventional web browsers allow local storage of username and password information so that login information can be automatically filled into log in forms, such login information is inaccessible when the user wants to run a different browser on the same computing device, or use a different computing device.

Moreover, because conventional web browsers locally store user login information in a weak encrypted format, an attacker can easily retrieve such information when the attacker gains access to the user's computer. Because most users are not savvy enough to realize the vulnerability of their sensitive information, the users do not enable non-default browser functionality that can protect stored passwords with a master password. In addition, conventional technology that utilizes simple password authentication can be easily compromised. Although methods exist, e.g., SSL protocol, to protect simple password authentication from attack, attackers can acquire username and password information by phishing for this information.

Compared to current password management technology, the novel systems and methods of the claimed subject matter securely manage Internet usernames and passwords by storing such information in a central database that can be accessed by a web browser or a non-browser software application resident on the user's computing device (i.e. a widget). Unlike conventional password technology, the subject invention requires Internet users to remember only one "master password," which allows a user to log into website accounts associated with different username and password combinations from any Internet enabled computing device.

The following presents some concepts of the disclosed subject matter in a simplified form as a prelude to the more detailed description that is presented later.

The subject invention provides systems and methods for facilitating a more enjoyable Internet user experience. According to one aspect of the disclosed subject matter, a formation component can enable a user to create a master account on a web server, the master account comprising a master username and password. An access component can enable the user to access a plurality of password protected websites associated with the master account when the user logs into the master account from a web browser or widget by entering the master username and password. By storing username and password information of websites in a central database, a user is required to remember only one password that allows the user to log into all website accounts for which the user is registered. Moreover, the novel systems and methods of the subject invention enable secure management and access of sensitive information from any Internet enabled computer or computing device.

According to another aspect of the disclosed subject matter, a selection component can log the user into a website of the plurality of password protected websites when the user selects a hyperlink associated with the website, selects a linked image associated with the website, or selects the website from a pulldown list contained in a web browser's toolbar. A display component can present a web browser window or tab associated with the website when the user selects the hyperlink, selects the linked image, or selects the website from the pulldown list contained in the web browser's toolbar—the username and password combination of the website comprising at least one password. In this way, the user can access websites associated with username and password combinations without entering a username and password(s) for each website the user wants to access—once the user logs into the master account on the web server, the user can access other websites by, e.g., simply clicking on a hyperlink.

According to yet another aspect of the disclosed subject matter, a management component can prompt the user to enter the URL and the username and password combination of each website of the plurality of password protected websites. A storage component can store the URL and username and the password combination of each website in a database of the master account. A review component can enable the user to view a list of the stored URL and username and password combination of each website. An update component can enable the user to modify the list of stored URLs and stored username and password combinations. According to one aspect of the disclosed subject matter, the hyperlink, linked image, or website from a pulldown list contained in a web browser toolbar can be selected from a database of the master account—facilitating a more enjoyable Internet user experience by allowing a user to securely access sensitive information from any Internet enabled device without remembering a plethora of usernames and passwords.

In other aspects of the disclosed subject matter, the novel systems and methods of the subject invention can include a security component associated with one or more additional authentication techniques, the security component further guarding against data security threats. Such techniques can include at least fingerprint identification, credentials identification, or secure sockets layer (SSL) protocol. According to yet another aspect of the disclosed subject matter, the one or more additional authentication techniques can include presenting the user with a URL associated with the master account when the user attempts to log into the master account, requesting the user to verify text in the address bar of the web browser by comparing it to the URL associated with the master account. Further, the user can be warned not to enter the user's master username and password if the text in the address bar is different from the URL associated with the master account. In one aspect of the disclosed subject matter, the user can be warned, each time the user accesses the master account, to not enter his/her master username and password in future login attempts if the user is not prompted to compare text in the URL window to the URL associated with the master account.

According to another aspect of the subject invention, the user can be enabled to enter his/her master username and password into a login form presented in a window of the web browser or widget. The user can command the web server to authenticate the user's master username and password, the web browser prevented from saving the master password in the browser's password manager. If incorrectly entered, the master username and password can be discarded and the user can be prompted to reenter the user's master username and password. Once the user's master username and password are successfully authenticated, the master password can be scrambled and saved as a transient cookie in the web browser's main memory, or saved to persistent memory that is not associated with a cookie—the scrambled master password at least utilized as an encryption key (i.e., passphrase).

Further, the user can be prompted to add one or more password protected websites to the master account, the user prompted to add a website URL and username and password combination associated with the website into a login form. Browser or widget software can encrypt the username and password combination of the one or more password protected websites when the one or more password protected websites are added to the master account. The encrypted username and password combination of the one or more password protected websites can be transmitted to the web server and stored in the web server database.

According to yet another aspect of the subject invention, the user can be presented with a list of hyperlinks associated with the plurality of password protected websites upon successful authentication of the user's master username and password. When the user selects one of the hyperlinks of the list of hyperlinks, the login form information, browser based scripts and encrypted username and password combination associated with the selected hyperlink can be downloaded from the web server to the web browser or widget using the SSL protocol, the login form information and browser based scripts sent in plaintext. The encrypted username and password combination can be locally decrypted using the saved master password as the encryption key. Any browser based scripts encapsulated in the login form can be executed to update the login form fields. In addition, the plaintext username and password combination can be inserted into the login form and an HTTP POST request that contains the login form information can be generated. The user can be automatically logged into a website associated with the selected hyperlink and a web browser window or tab associated with the website can be opened.

In one aspect of the subject invention, a learning component can determine the structure of login forms for each website of the plurality of password protected websites. The learning component can execute a script that queries a website and can download an HTML file for the website's main page when the user adds a new URL and username and password combination associated with the website to the master account database. Also, default browser based scripts of the website's main page can be executed. If the login form is found on the website's main page, the learning component can store the login form and browser based scripts in the web server database.

If a login form is not found on the website's main page, the login component can iteratively search for login forms and store them and the browser based scripts for the associated page in the web server database. Moreover, the learning component can prevent the user from attempting to log into the website before the website's login form information is stored in the web server database. The learning component can send a message to the user and a system administrator if no login form information is found. In another aspect of the subject invention, the learning component can periodically execute a script that re-queries the websites stored in the web server database—the web server database updated with changed login form and browser based script information.

In other aspects of the disclosed subject matter, a browser component can enable the user to upload to the web server, username and password combinations locally stored by a web browser and associated with the plurality of password protected websites. In this way, username and password combinations insecurely stored on a local computer or computing device can be stored on a secure web server where they can be accessed by any Internet enabled computing device. According to yet another aspect of the subject invention, the browser component can enable the user to download and install an add-in utility, which can be embedded into the web browser and can access the web browser's internal data. The browser component can prompt the user to enter a locally stored web browser password that enables access to the username and password combinations.

After the web server authenticates the user, the browser component can encrypt the locally stored username and password combinations using the master password as the encryption key. The browser component can then transmit the encrypted username and password combinations and the associated website addresses to the web server.

Further, the browser component can store the encrypted username and password combinations and the associated website addresses in the database of the master account. The browser component can then disable the browser from prompting the user to save passwords locally, enable the user to delete the locally stored username and password combinations, and acquire the login forms and browser based scripts of the websites associated with the username and password combinations. In one aspect of the subject invention, the web browser can be Firefox®.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

Embodiments of systems and methods for securely managing Internet user passwords while facilitating a more enjoyable Internet user experience are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

The subject invention provides systems and methods that facilitate efficient and secure management of usernames and passwords, enhancing Internet user interaction with the World Wide Web. To this end, embodiments of the invention include techniques for securely managing Internet usernames and passwords by storing such information in a central database that a user can access by a web browser or widget on any Internet enabled computing device. In this way, the user is required to remember only one password, or master password, which allows the user to log into all website accounts for which the user is registered.

FIG. 1 is a demonstrative system 100 for securely managing Internet user passwords while facilitating a more enjoyable Internet user experience, in accordance with an embodiment of the invention. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

System 100 illustrated by FIG. 1 can include a formation component 110 that can enable a user to create a master account on a web server, the master account comprising a master username and password. When the user logs into the master account by entering the master username and password, an access component 120 can enable the user to access a plurality of password protected websites from a web browser or widget. By storing username and password information of websites in a central database, a user is required to remember only one password that allows the user to log into all website accounts for which the user is registered. Moreover, the novel systems and methods of the subject invention enable secure management and access of sensitive information from any browser running on any Internet enabled computer or computing device.

Figure 2:
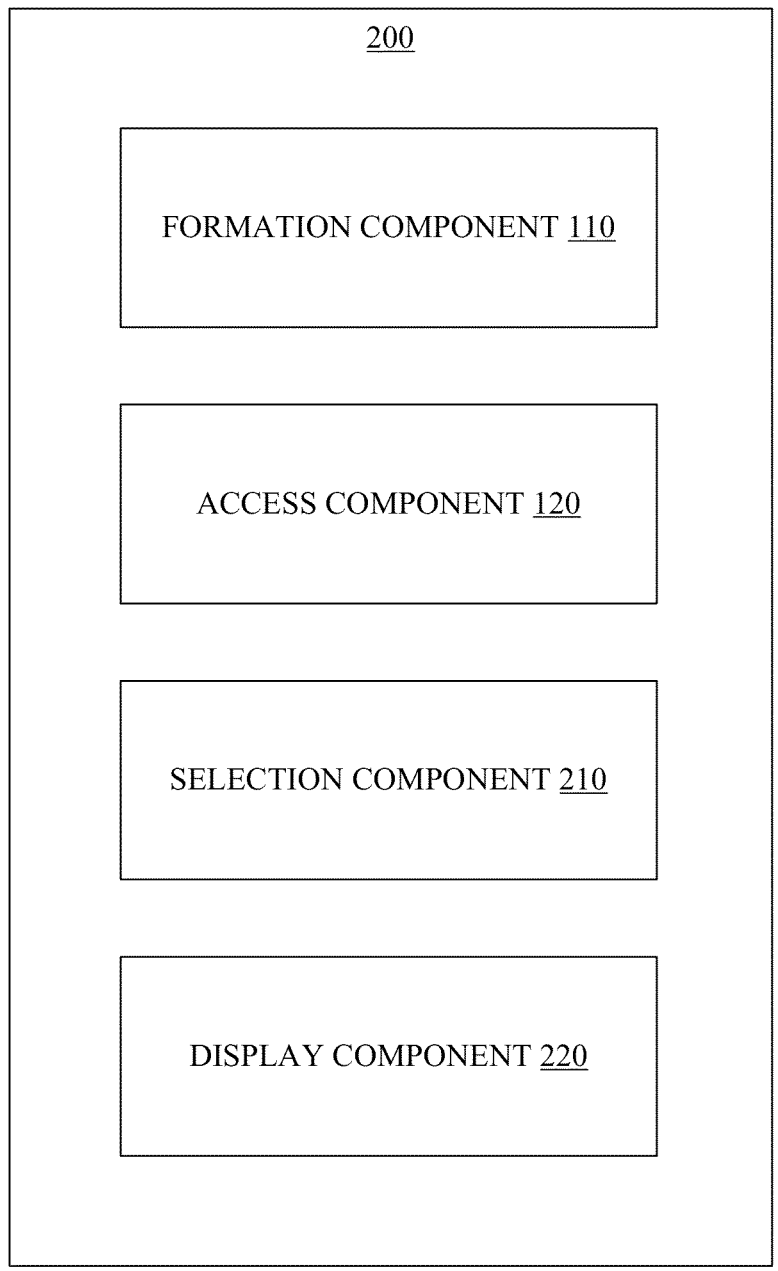
FIG. 2 is another demonstrative system for securely managing Internet user passwords while facilitating a more enjoyable Internet user experience, in accordance with an embodiment of the invention.

FIG. 2 is illustrates a demonstrative system 200 for securely managing Internet user passwords while facilitating a more enjoyable Internet user experience, in accordance with an embodiment of the invention. A selection component 210 can log the user into a website of the plurality of password protected websites when the user selects a hyperlink associated with the website, selects a linked image associated with the website, or selects the website from a pulldown list contained in a toolbar of a web browser. A display component 210 can present a web browser window or tab associated with the website when the user selects the hyperlink, selects the linked image, or selects the website from the pulldown list contained in the toolbar of the web browser—the website associated with a username and password combination that enables the user to access the website. The username and password combination of the website includes at least one password. In this way, the user can access websites associated with username and password combinations without entering a username and password combination for each website the user wants to access—once the user logs into the master account on the web server, the user can access other websites by, e.g., simply clicking on a hyperlink.

Figure 3:
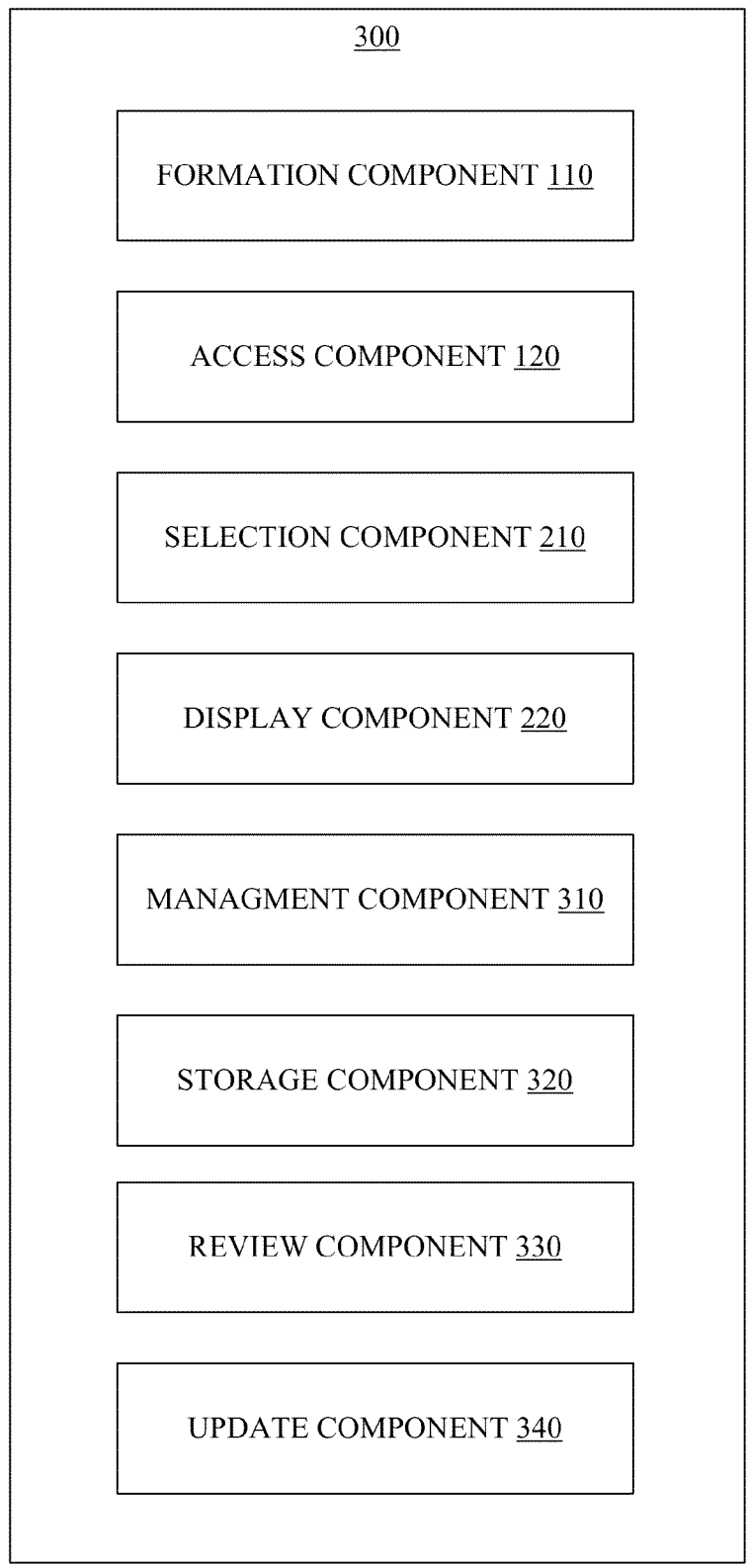
FIG. 3 is yet another demonstrative system for securely managing Internet user passwords while facilitating a more enjoyable Internet user experience, in accordance with an embodiment of the invention.

FIG. 3 is yet another demonstrative system for securely managing Internet user passwords while facilitating a more enjoyable Internet user experience, in accordance with an embodiment of the invention. A management component 310 can prompt the user to enter the URL and the username and password combination of each website of the plurality of password protected websites. Further, a storage component 320 can store the URL and username and the password combination for each website in a database of the master account. A review component 330 can enable the user to view a list of the stored URL and username and password combinations for each website. An update component 340 can enable the user to modify the list of stored URLs and stored username and password combinations. According to one aspect of the disclosed subject matter, the hyperlink, linked image, or website from a pulldown list contained in a web browser toolbar can be selected from a database of the master account, facilitating a more enjoyable Internet user experience by allowing a user to securely access sensitive information from any Internet enabled device without remembering a plethora of usernames, passwords, and other login information.

Figure 4:
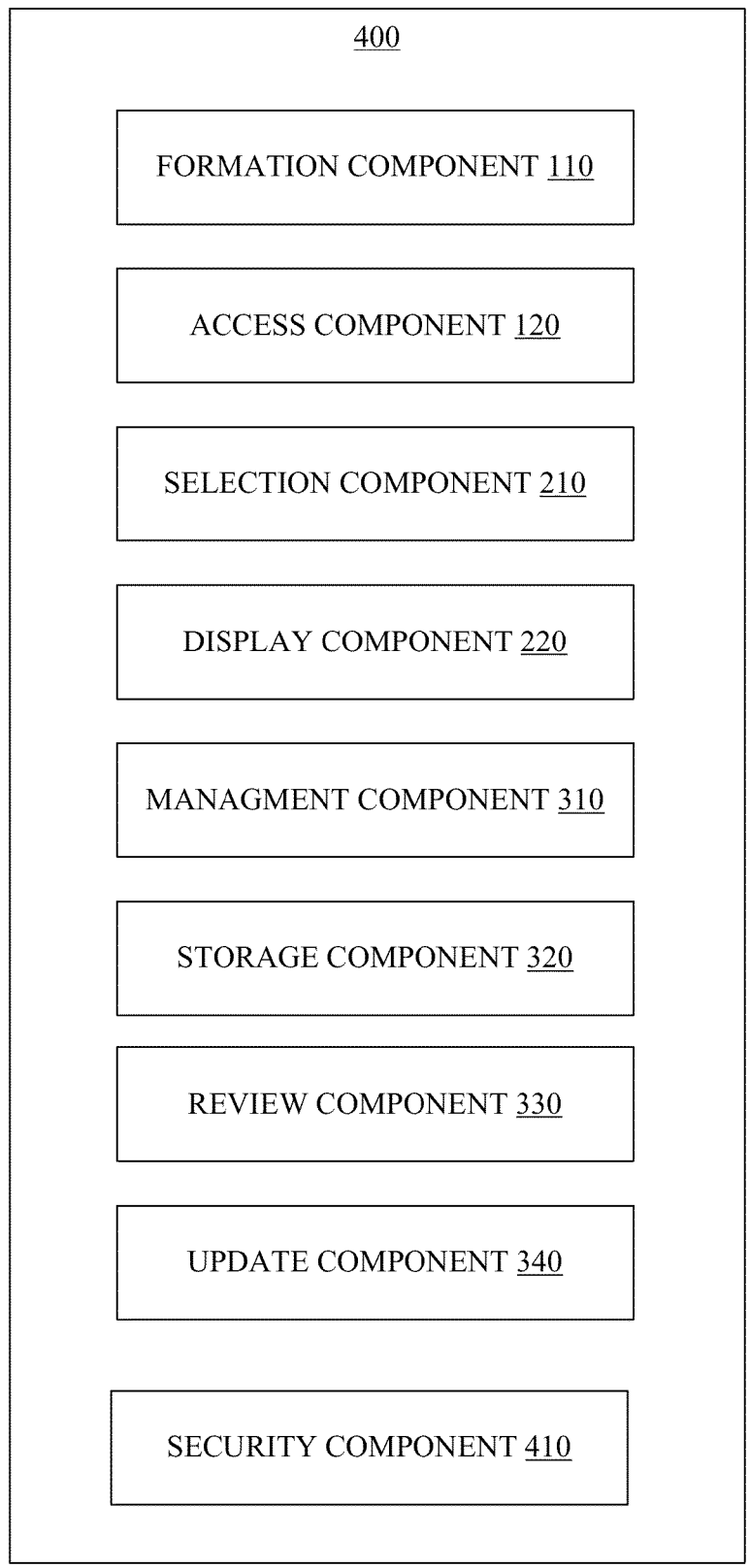
FIG. 4 is a demonstrative system including a security component for facilitating efficient and secure management of usernames and passwords, in accordance with an embodiment of the invention.

FIG. 4 is a demonstrative system 400 that includes a security component 410 for facilitating efficient and secure management of usernames and passwords, in accordance with an embodiment of the invention. Websites that rely on simple password (i.e., single username and password) authentication are easily compromised if an attacker gains access to a user's username and password. To address this problem, an embodiment of the subject invention employs security component 410 to include one or more additional authentication techniques including fingerprint identification, credentials identification, and/or secure sockets layer (SSL) protocol.

Attackers can acquire username and password information by a process known as phishing. This involves sending an email to a large list of people, telling them that they need to log in to a particular site for one reason or another. The email contains a hyperlink, which directs the user to a site that looks identical to the real site, but is hosted by the attacker(s). When the user enters his/her username and password into the fake site, the information is handed over to the attacker(s). To mitigate such threats, in another embodiment, security component 410 can present the user with a URL associated with the master account when the user attempts to log into the master account. Further, security component 410 can request that the user verify that text in the address bar of the web browser is equivalent to the URL associated with the master account and warn the user not to enter the user's master username and password if the text in the address bar is different from the URL associated with the master account. In yet another embodiment, security component 410 can warn the user, each time the user accesses his/her master account, not to enter his/her password in future login attempts if the user is not prompted to compare text in the URL window to the URL associated with the master account. In these ways, unlike conventional technology, the subject invention can address a diverse array of security threats.

Figure 5:
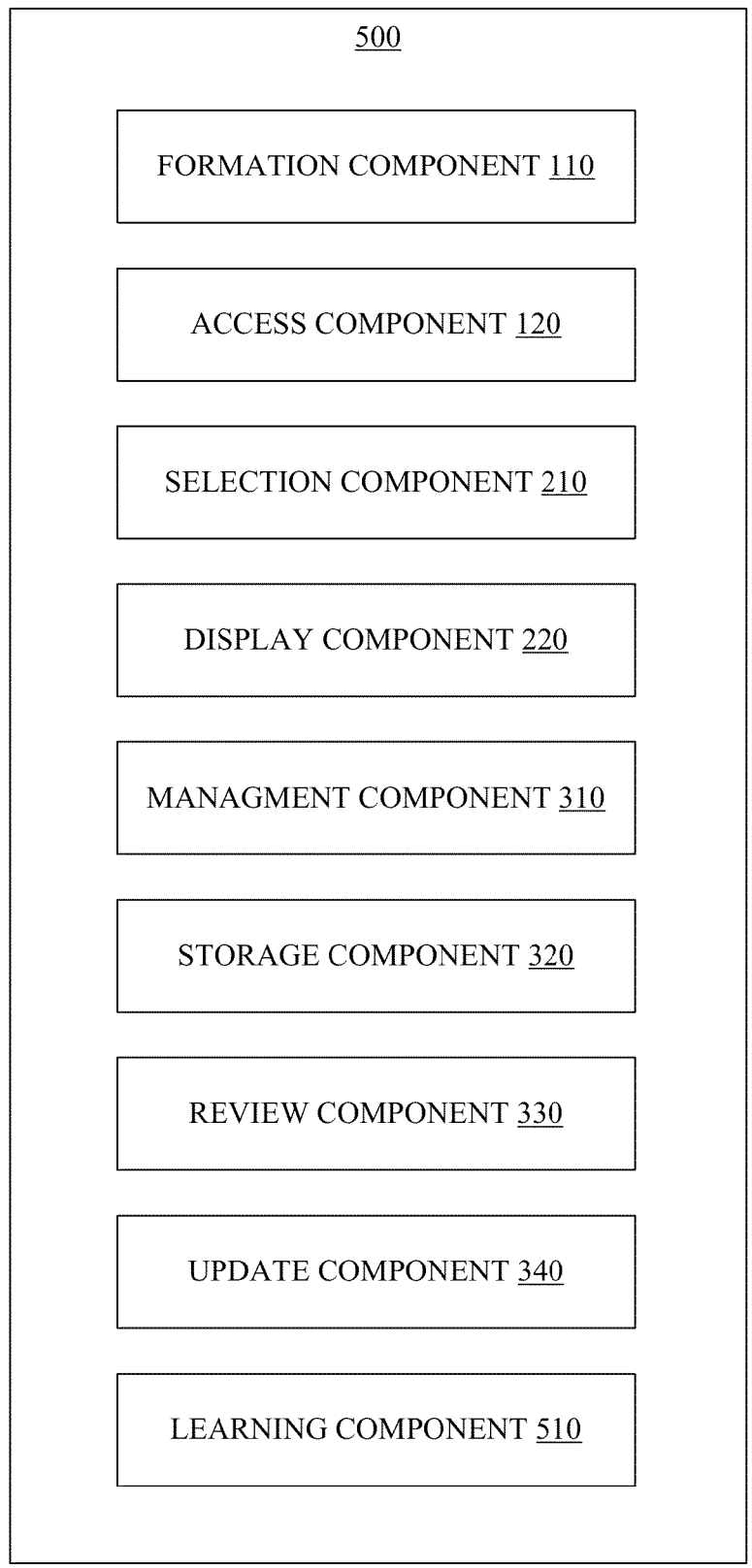
FIG. 5 is a demonstrative system including a learning component for facilitating efficient and secure management of usernames and passwords, in accordance with an embodiment of the invention.

FIG. 5 is a demonstrative system 500 that includes a learning component 510 for facilitating efficient and secure management of username and password combinations, in accordance with an embodiment of the invention. To log in to a typical website, a user enters his/her username and password into textboxes on the login page and clicks the "Log In" button. The browser inserts the username and password into a form object, encapsulates it into an HTTP POST request, and submits it to a web server. The server authenticates the user, and then redirects the browser to a main page if the authentication is successful. The novel systems and methods of the subject invention simplify this process because the user no longer has to enter his/her username and password for each site the user wants to access. Once the user logs into the master account utilizing the master username and password, the user can access other password protected websites by, e.g., simply clicking a hyperlink or linked image.

To determine the structure of the login forms for each website that the user wants to access, in one embodiment, learning component 510 can determine the structure of login forms for each website of the plurality of password protected websites. To this end, learning component 510 can execute a script that queries a website and downloads an HTML file for the website's main page when the user adds a new URL and username and password combination associated with the website to the master account database. Further, learning component 510 can execute default browser based scripts of the website's main page. If the login form is found on the website's main page, learning component 510 can store the login form and browser based scripts in the web server database. If a login form is not found on the website's main page, login component 510 can iteratively search for login forms on the website's other pages and once found, store them and the browser based scripts for the associated page in the web server database.

Moreover, learning component 510 can prevent the user from attempting to log into the website before the website's login form information is stored in the web server database. Also, learning component 510 can send a message to the user and a system administrator if no login form information is found. In another embodiment, learning component 510 can periodically execute a script that re-queries the websites stored in the web server database and update the web server database with changed login form and browser based script information.

Figure 6:
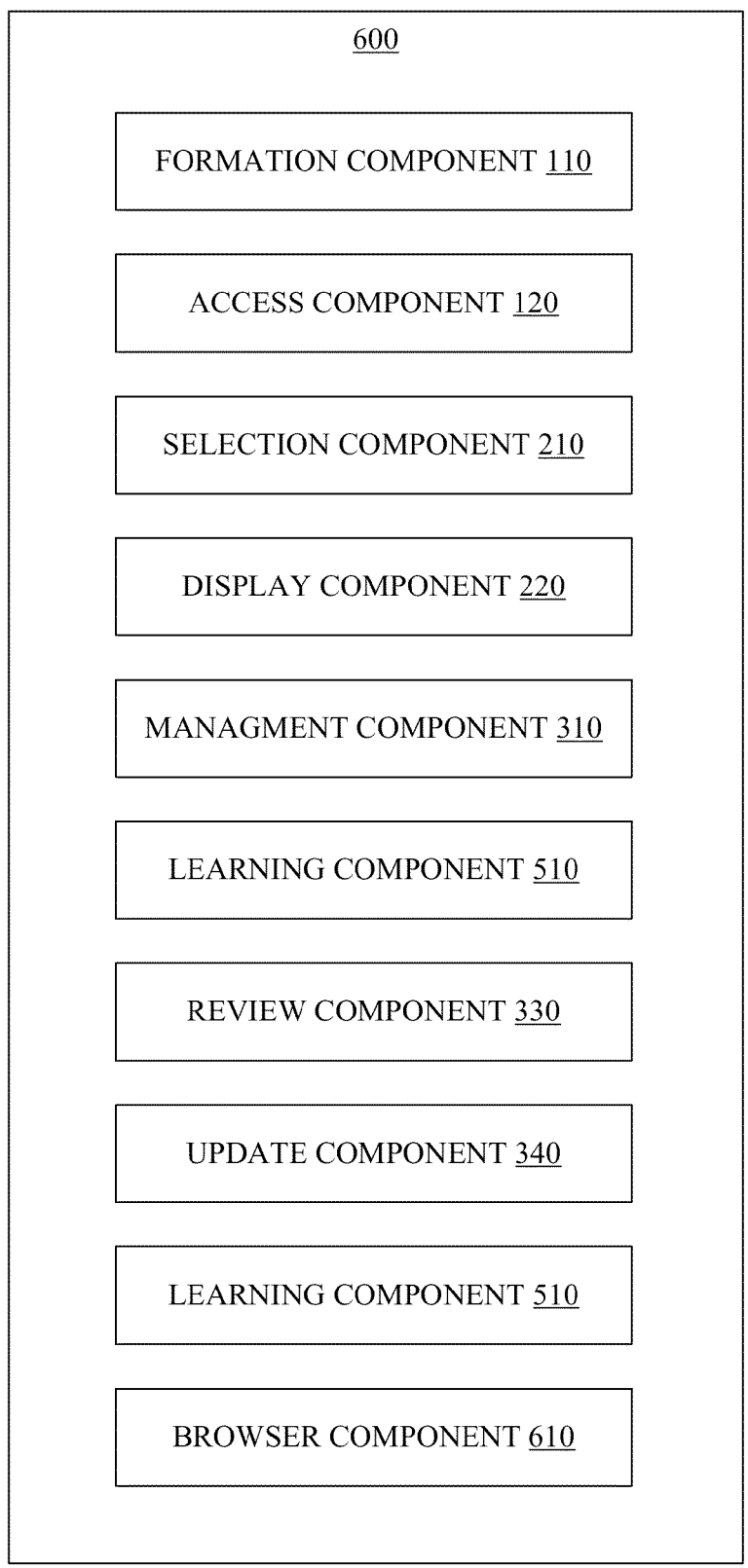
FIG. 6 is a demonstrative system including a browser component for facilitating efficient and secure management of usernames and passwords, in accordance with an embodiment of the invention.

FIG. 6 is a demonstrative system 600 that includes a browser component 610 for facilitating efficient and secure management of usernames and passwords, in accordance with an embodiment of the invention. Conventional browser tools (e.g., Mozilla Firefox®) give a user the option to store usernames and passwords to a local file when the user enters this information into a login form for the first time. When the user goes back to a website for which he/she previously stored the username and password, these browser tools can automatically fill in the login form information (the password masked with asterisks), allowing the user to log in with one click. While saving passwords locally using a browser is one means of managing passwords, there are several drawbacks. First, from a convenience standpoint, the user must use a browser exclusively on the same computer or computing device where the user originally stored his/her information. If the user wants to run a different browser on the same computer or use a different computing device, this information is not accessible.

Second, a user's passwords and related login information are stored locally on the user's computer or computing device in a weak encrypted format, potentially without his/her knowledge. For example, passwords are easily retrieved by clicking the "Show Passwords" button in Firefox® (under "Privacy" preferences). Although Firefox® allows the user to lock the passwords stored locally using a master password, this is not the default setting. Most users are not savvy enough to realize the vulnerability of their sensitive information. If an attacker gains access to the user's computer and the user does not use the browser's password feature, the attacker can easily view all of the stored plaintext passwords. To address these issues, in an embodiment of the subject invention, browser component 610 enables a user to upload username and password combinations associated with the plurality of password protected websites to the web server. In this way, username and password combinations that are insecurely stored on a local computer can be securely stored on a web server, where they can be accessed by any Internet enabled computing device.

FIGS. 7-12 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

As described above, conventional techniques for managing usernames and passwords burden Internet users because they must manage different usernames and passwords to access different password protected websites. Although conventional web browsers allow local storage of username and password information so that login information can be automatically filled into log in forms, such login information is inaccessible when the user wants to run a different browser on the same computing device, or use a different computing device.

Moreover, because conventional web browsers locally store user login information in a weak encrypted format, an attacker can easily retrieve such information when the attacker gains access to the user's computer. Because most users are not savvy enough to realize the vulnerability of their sensitive information, the users do not enable non-default browser functionality that can protect stored passwords with a browser password. In addition, conventional technology that utilizes simple password authentication can be easily compromised. Although methods exist, e.g., SSL protocol, to protect simple password authentication from attack, attackers can acquire username and password information by phishing for this information.

Compared to current password management technology, the novel systems and methods of the claimed subject matter securely manage Internet usernames and passwords by storing such information in a central database that can be accessed by a web browser or widget. Unlike conventional password technology, the subject invention requires Internet users to remember only one "master password," which allows a user to log into website accounts associated with different username and password combinations from any Internet enabled computing device.

Figure 7:
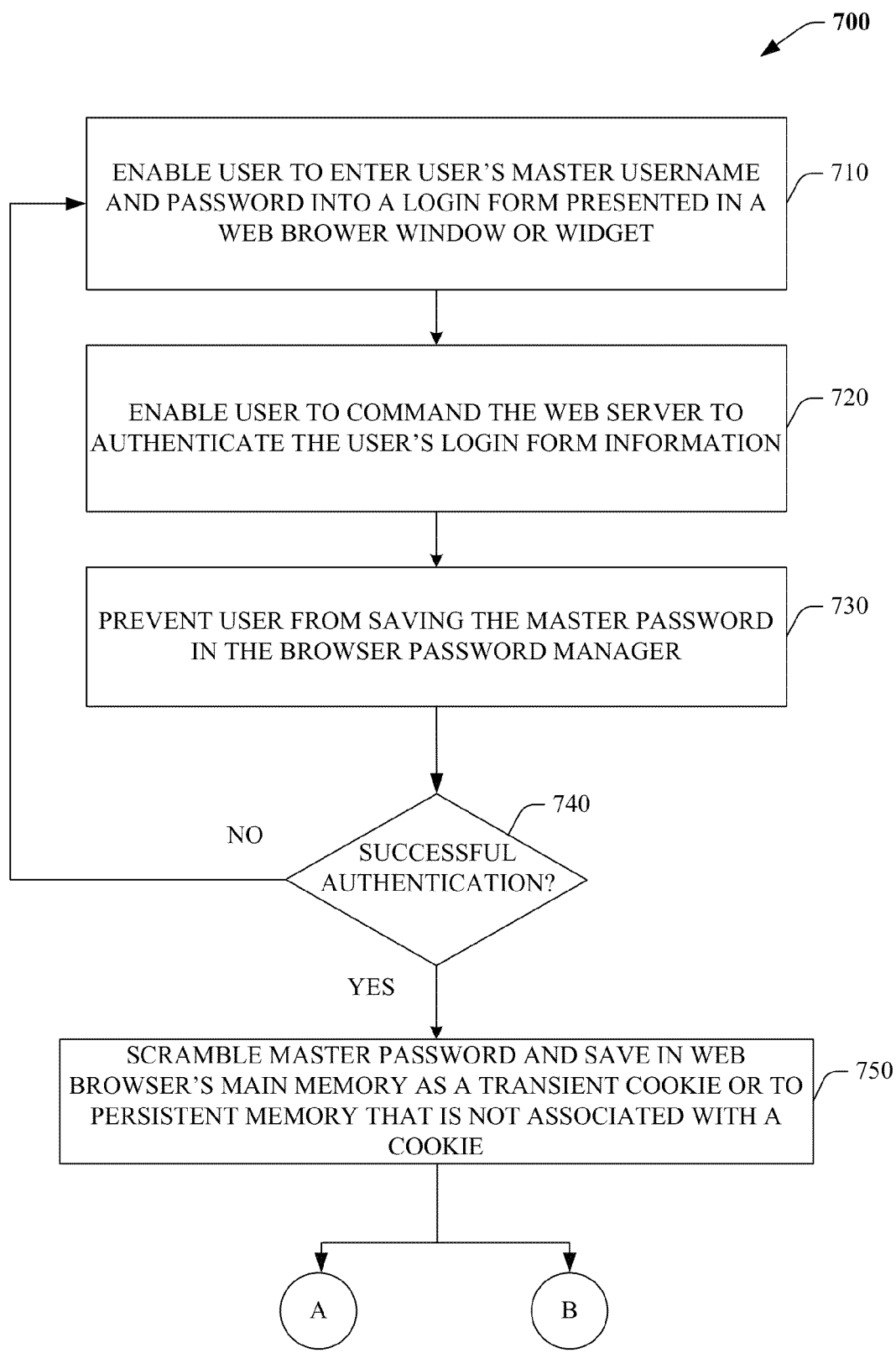
FIG. 7 illustrates a process by which a user can securely access a master account, in accordance with an embodiment of the invention.

Referring now to FIG. 7, a process 700 by which a user can securely access a master account is illustrated, in accordance with an embodiment of the invention. At 710, a user can be enabled to enter a master username and password into a login form presented in a window of a web browser or widget. At 720, the user can be enabled to command the web server to authenticate the user's master username and password. The web browser can be prevented from saving the master password to the browser's password manager at 730. Incorrectly entered master username and password login information can be discarded and the user prompted to reenter the user's master username and password at 740. The master password can be scrambled and saved in the web browser's main memory as a transient cookie, or saved to persistent memory that is not associated with a cookie, at 750, upon successful authentication of the user's master username and password— the stored scrambled master password can be used as an encryption key.

Figure 8:
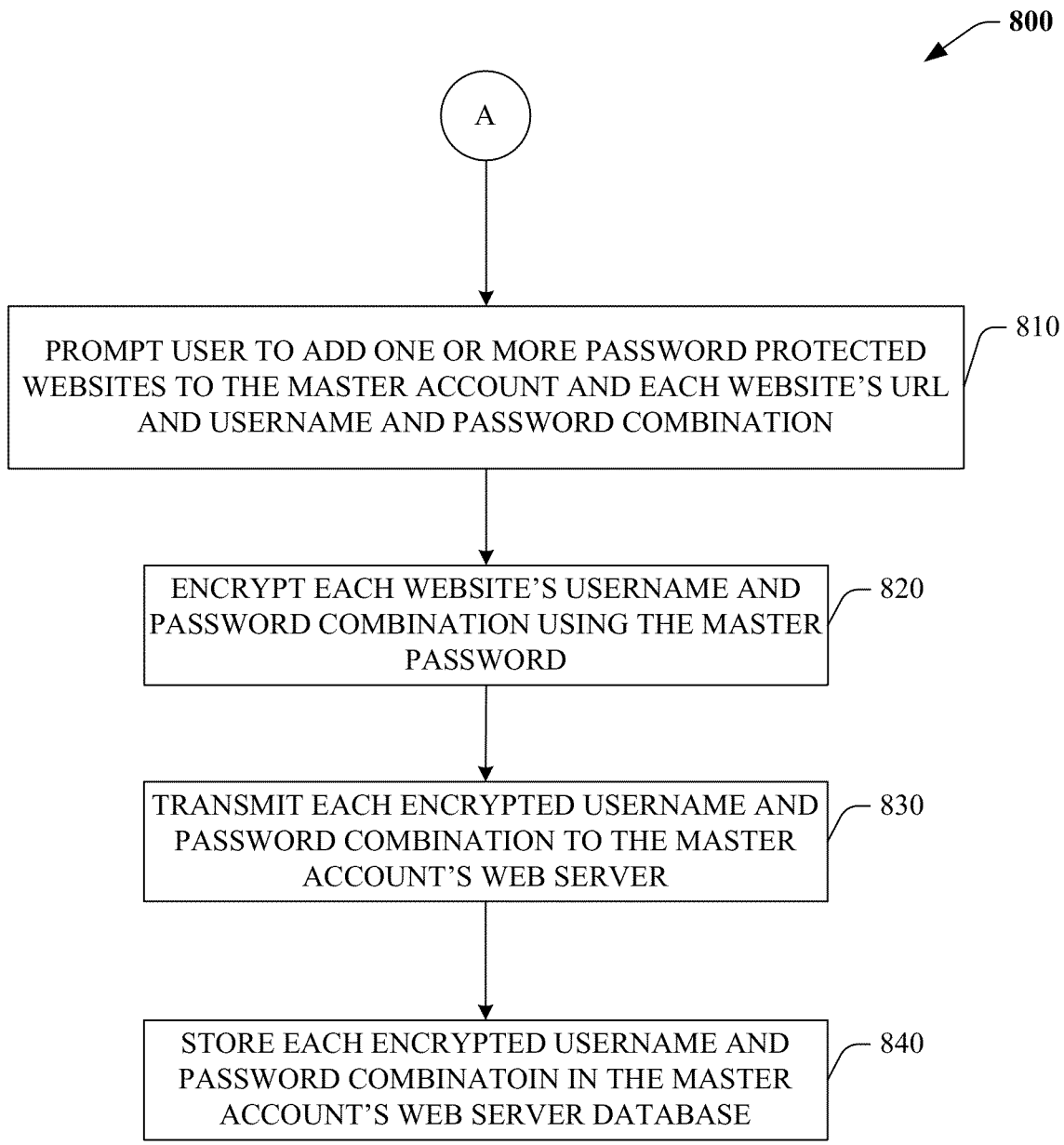
FIG. 8 illustrates a process by which a user can securely add password protected websites to the master account, in accordance with an embodiment of the invention.

FIG. 8 illustrates a process 800 by which a user can securely add password protected websites to the master account, in accordance with an embodiment of the invention. At 810, the user can be prompted to add one or more password protected websites to the master account—the user can be prompted to add a website URL and username and password combination associated with the website into a login form. Each website's username and password combination, which includes at least one password can be encrypted by the web browser or widget using the master password at 820. At 830, encrypted username and password combination information for each website for which the user has a password-protected account can be transmitted to the web server. The encrypted username and password combination information of the one or more password protected websites can be stored in the web server database at 840.

Figure 9:
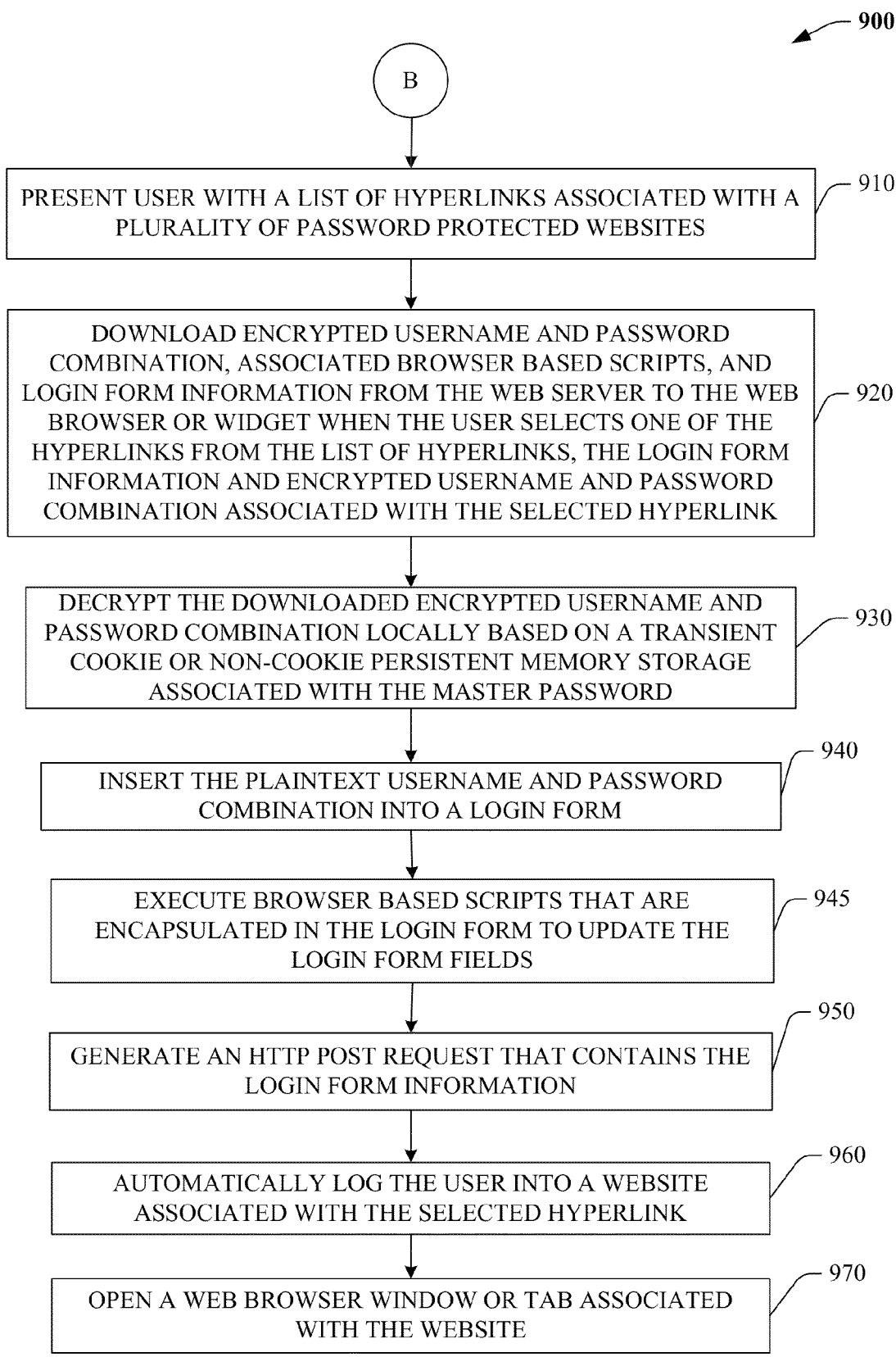
FIG. 9 illustrates a process by which a user can securely access sensitive information from any Internet enabled computer or computing device, in accordance with an embodiment of the invention.

FIG. 9 illustrates a process 900 by which a user can securely access sensitive information from any Internet enabled computing device, in accordance with an embodiment of the invention. At 910, the user can be presented with a list of hyperlinks associated with the plurality of password protected websites upon successful authentication of the user's master username and password. When the user selects one of the hyperlinks from his list of password-protected accounts, the login form information, browser based scripts and encrypted username and password combination associated with the selected hyperlink can be downloaded from the web server to the web browser or widget using the SSL protocol at 920, the login form and browser script information sent in plaintext. The encrypted username and password combination can be locally decrypted at 930 using the saved master password as the encryption key. In addition, the plaintext username and password combination can be inserted into the login form at 940. Browser based scripts that are encapsulated in the login form are executed to update the login form fields at 945. At 950, an HTTP POST request that contains the login form information can be generated, possibly requiring execution of the downloaded browser based scripts that are encapsulated in the login form to update the login form fields. The user can be automatically logged into a website associated with the selected hyperlink at 960, and a web browser window or tab associated with the website can be opened at 970.

Figure 10:
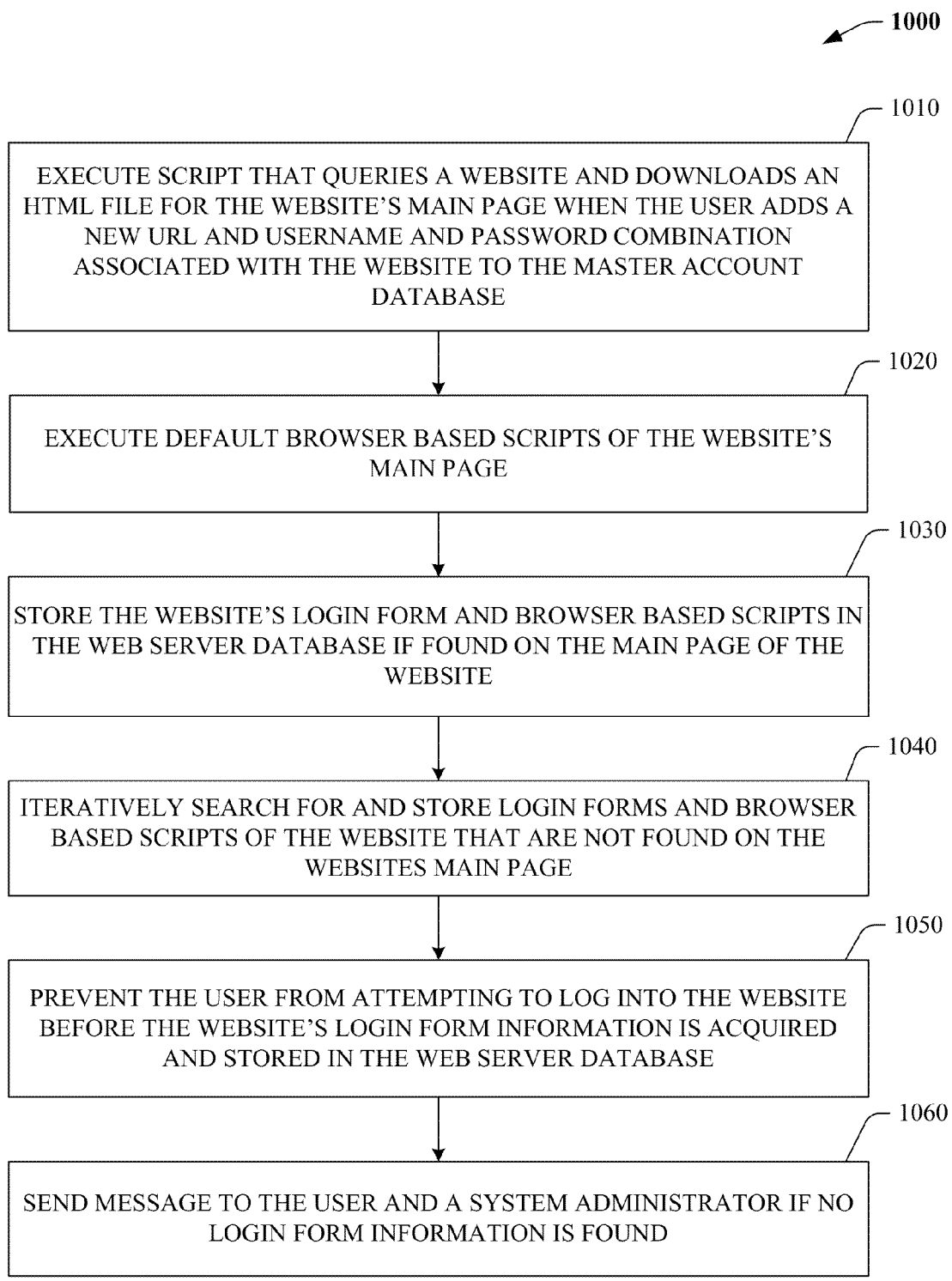
FIG. 10 illustrates a process by which a learning component acquires a website's login form and browser based script information, in accordance with an embodiment of the invention.

FIG. 10 illustrates a process 1000 by which a learning component acquires a website's login form and browser based script information, in accordance with an embodiment of the invention. At 1010, a script can be executed that queries a website and downloads an HTML file for the website's main page when the user adds a new URL and username and password combination associated with the website to the master account database. Default browser based scripts of the website's main page can be executed at 1020. If the login form is found on the website's main page, the learning component can store the login form and browser based scripts in the web server database at 1030. If a login form is not found on the website's main page, the login component can iteratively search for login forms on the site's other pages and once found, store them and the browser based scripts associated with that page in the web server database at 1040. Moreover, the user can be prevented, at 1050, from attempting to log into the website before the website's login form information is stored in the web server database. At 1060, a message can be sent to the user and a system administrator if no login form information is found.

Figure 11:
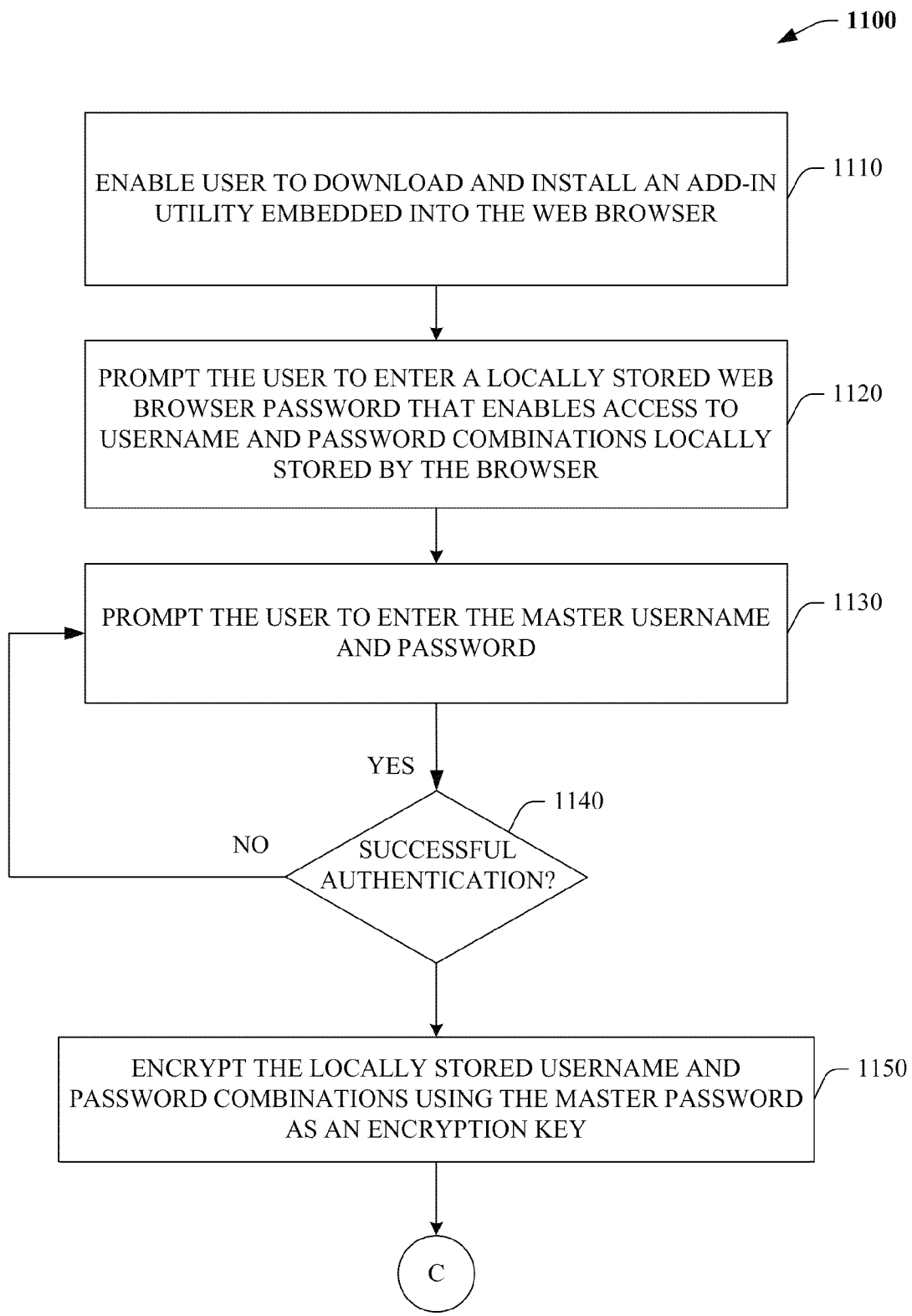
FIG. 11 illustrates a process by which a browser component enables the user to upload username and password combinations to the web server, in accordance with an embodiment of the invention.
Figure 12:
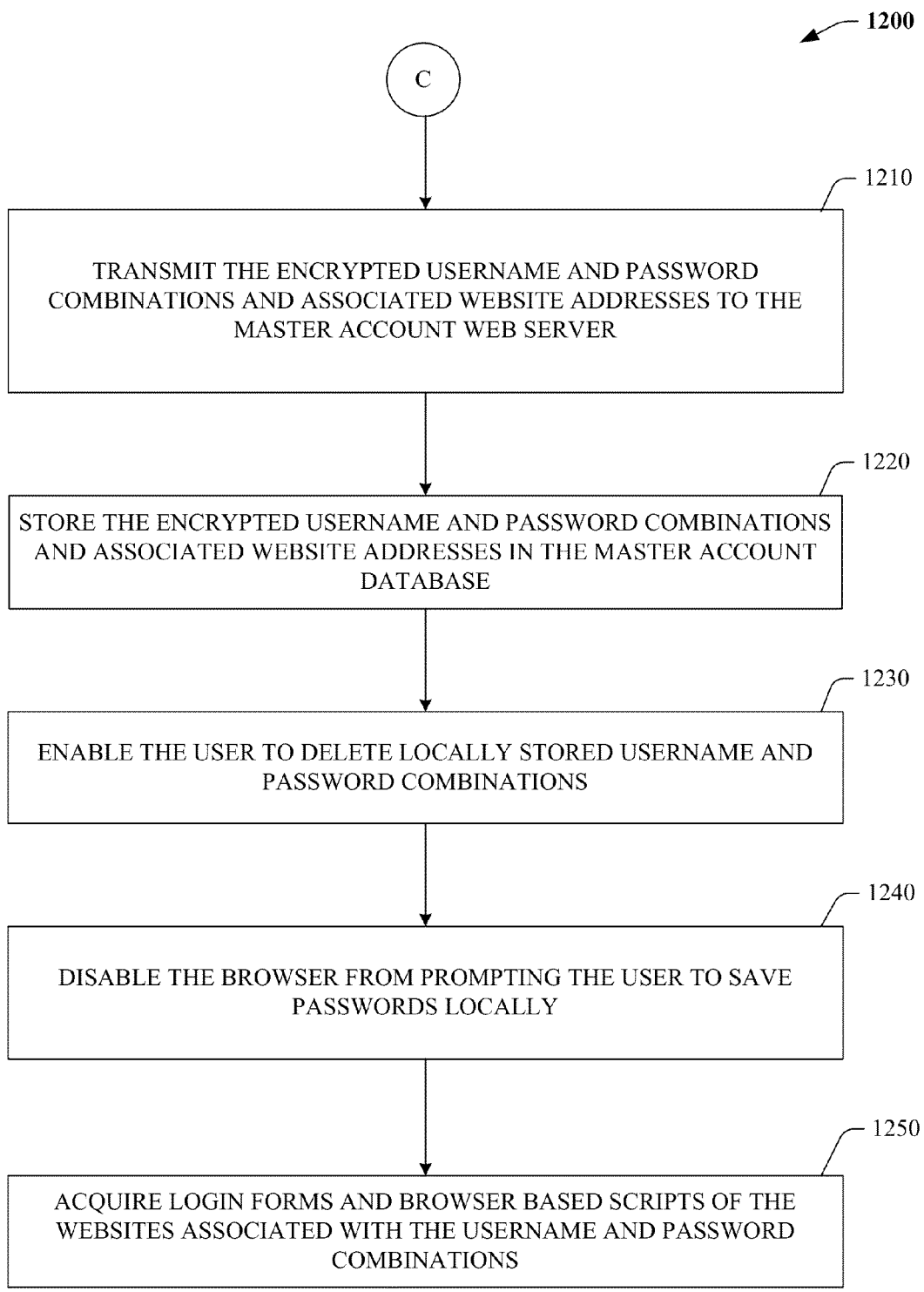
FIG. 12 further illustrates the process by which the browser component enables the user to upload username and password combinations to the web server, in accordance with an embodiment of the invention.

FIGS. 11-12 illustrate a process by which a browser component can enable the user to upload username and password combinations to the web server, in accordance with an embodiment of the invention. At 1110, the user can be enabled to download and install an add-in utility, which can be embedded into his web browser and can access the web browser's internal data. The user can be prompted, at 1120, to enter a locally stored web browser password that enables access to the user's browser-stored username and password combinations for password-protected websites. At 1130, the user can be prompted to enter the master name and password combination. After the web server authenticates the user at 1140, the locally stored username and password combinations can be encrypted at 1150, using the master password as the encryption key. The encrypted username and password combinations and the associated website addresses (URLs) can be transmitted to the master account web server at 1210.

At 1220, the encrypted username and password combinations and the URLs of the websites can be stored in the master account database. The browser component can enable the user to delete the locally stored username and password combinations at 1230. The browser can be disabled, at 1240, from prompting the user to locally save passwords. At 1250, the login forms and browser based scripts of the websites associated with the username and password combinations can be acquired. At 1260, the user can be enabled to select a website from a pulldown list contained in a toolbar of the web browser, the website associated with one of the username and password combinations.

In one aspect of the subject invention, the web browser can be Firefox®.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As utilized herein, terms "component," "system," "interface," and the like are intended to refer to a computer-related entity, hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. For example, in one embodiment, an artificial intelligence system can be used utilized in accordance with system 500 (e.g., learning component 510) to determine the structure of login forms for each website of the plurality of password protected websites. As used herein, the term "inference," "infer," or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events.

Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines) can be employed in connection with performing automatic and/or inferred action in connection with the disclosed subject matter.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include, but are not limited to, magnetic storage devices (e.g., hard disk, floppy disk, magnetic strips), optical disks (e.g., CD, DVD), smart cards, and flash memory devices (e.g., card, stick, key drive).

Further, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter. Moreover, the word "exemplary" is used herein to mean serving as an example, instance, or illustration. Any aspect or design described herein as "exemplary" is not necessarily to be construed as preferred or advantageous over other aspects or designs.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 13:
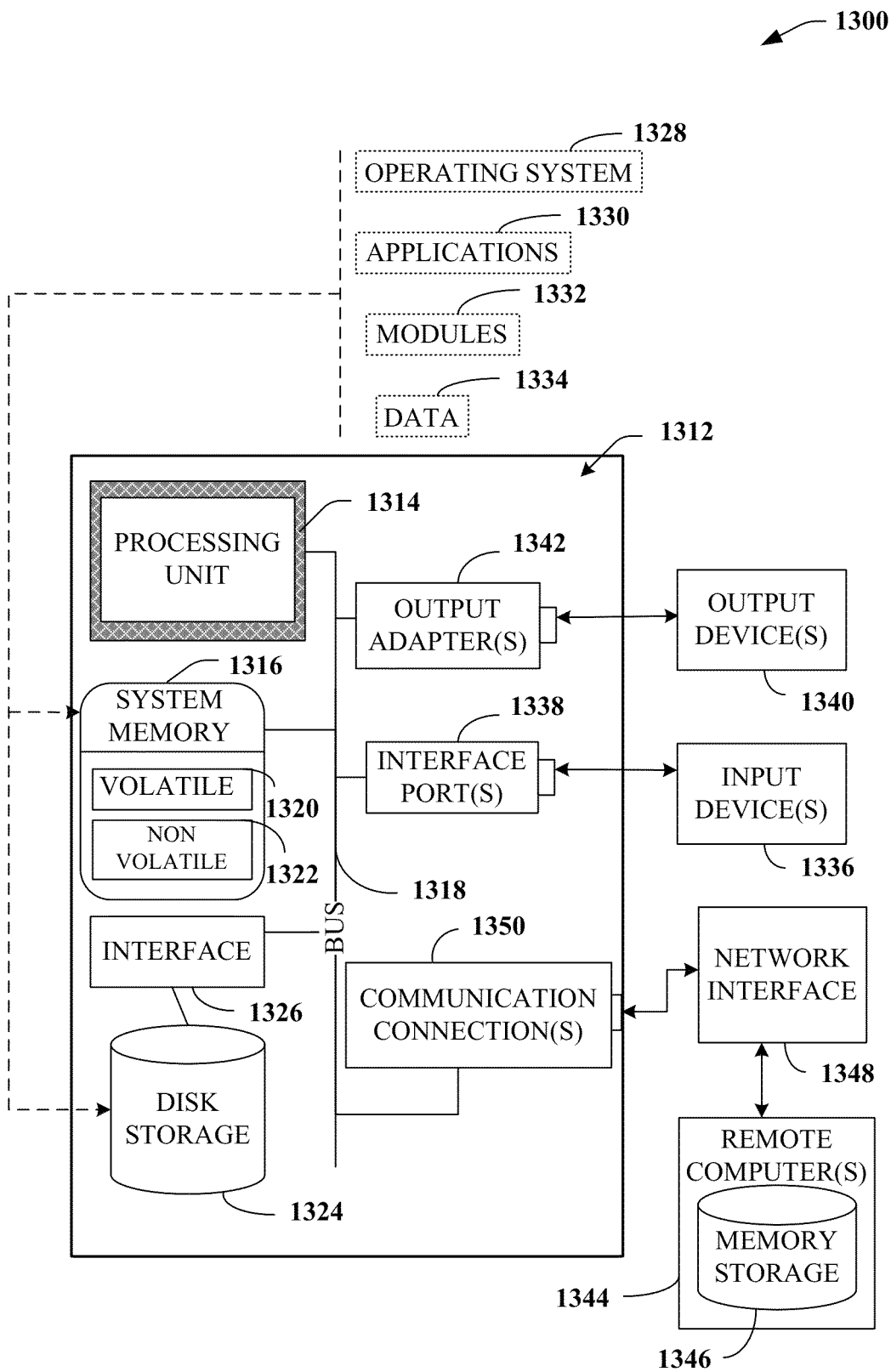
FIG. 13 illustrates a block diagram of a computer operable to execute the disclosed systems and methods, in accordance with an embodiment of the invention.
Figure 14:
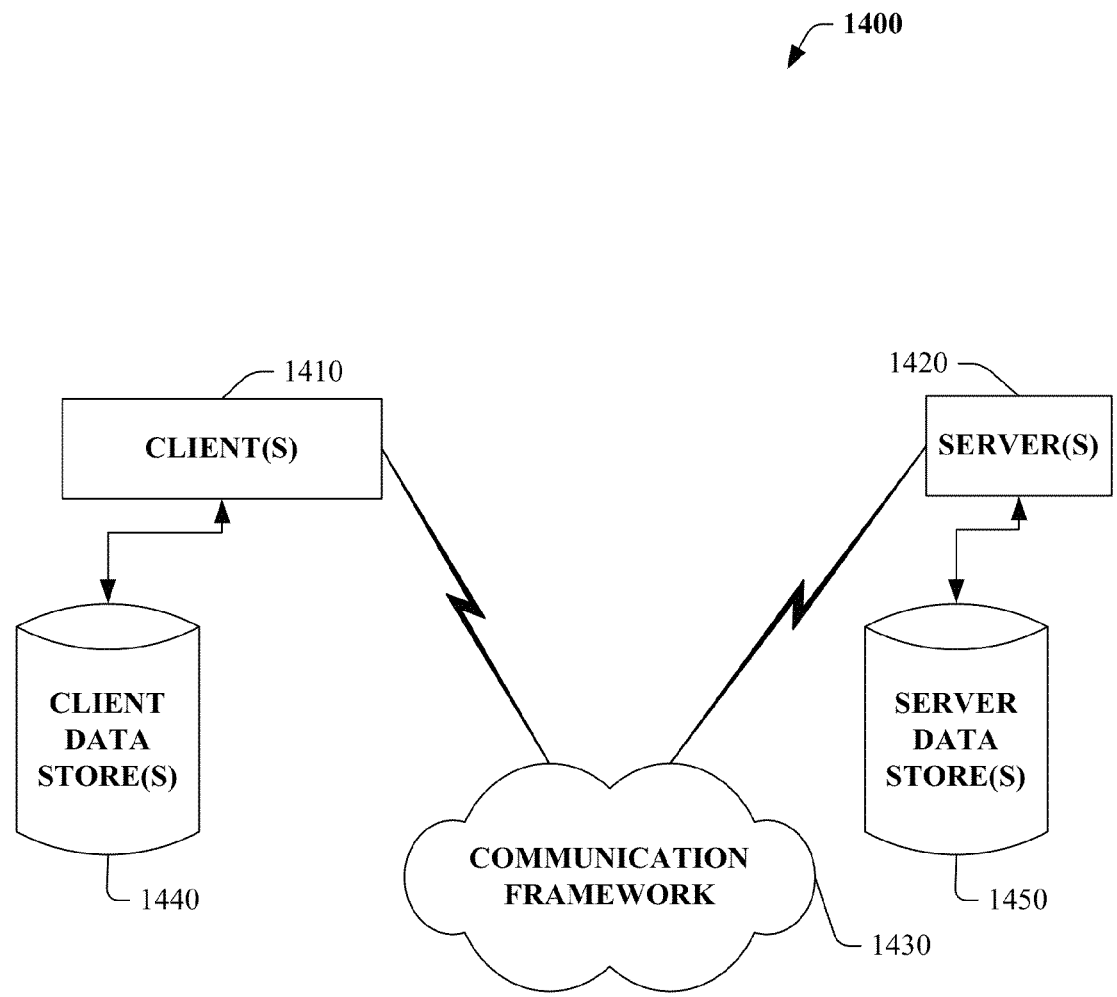
FIG. 14 illustrates a schematic block diagram of an exemplary computing environment, in accordance with an embodiment of the invention.

In order to provide a context for the various aspects of the disclosed subject matter, FIGS. 13 and 14, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 13, a block diagram of a computer 1300 operable to execute the disclosed systems and methods, in accordance with an embodiment of the invention, includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

It is to be appreciated that FIG. 13 describes software that acts as an intermediary between users and the basic computer resources described in the suitable operating environment 1300. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the disclosed subject matter can be implemented with various operating systems or combinations of operating systems.

A user enters commands or information into the computer 1311 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336.

Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refer(s) to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

FIG. 14 illustrates a schematic block diagram of an exemplary computing environment 1430, in accordance with an embodiment of the invention. The system 1400 includes one or more client(s) 1410. The client(s) 1410 can be hardware and/or software (e.g., threads, processes, computing devices). The system 1400 also includes one or more server(s) 1420. Thus, system 1400 can correspond to a two-tier client server model or a multi-tier model (e.g., client, middle tier server, data server), amongst other models. The server(s) 1420 can also be hardware and/or software (e.g., threads, processes, computing devices). The servers 1420 can house threads to perform transformations by employing the subject innovation, for example. One possible communication between a client 1410 and a server 1420 may be in the form of a data packet transmitted between two or more computer processes.

The system 1400 includes a communication framework 1430 that can be employed to facilitate communications between the client(s) 1410 and the server(s) 1420. The client(s) 1410 are operatively connected to one or more client data store(s) 1440 that can be employed to store information local to the client(s) 1410. Similarly, the server(s) 1420 are operatively connected to one or more server data store(s) 1450 that can be employed to store information local to the servers 1420.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system, comprising:
    a processor, coupled to a memory, that executes or facilitates execution of instructions stored in the memory to cause the system to at least:
        create master account data representing a master account for an identity comprising a master username and a master password;
        in response to an authentication of the identity utilizing the master username and the master password, enable access to password protected websites associated with the master account based on an encryption key that is a function of the master username and the master password;
        receive input representing a first password protected website of the password protected websites, and a username and a password that are associated with the first password protected website;
        encrypt the username and the password that are associated with the first password protected website using the encryption key resulting in encrypted access data;
        in further response to the authentication of the identity utilizing the master username and the master password, enable an upload, to a network data store, of encrypted username and password combinations locally stored by a web browser in association with the password protected websites; and
        in response to further input indicating a selection of the first password protected website, log into the first password protected website on behalf of the identity using the username and the password that are associated with the first password protected website by decrypting the encrypted access data.

2. The system of claim 1, wherein the selection of the first password protected website comprises at least one of a selection of a hyperlink associated with the first password protected website, a selection of a linked image associated with the first password protected website, or a selection of the first password protected website from a list displayed by a web browser application.

3. The system of claim 1, wherein the processor further executes or facilitates the execution of the instructions to cause the system to, based on the further input, initiate an execution of a web browser application or open an additional tab of an executing web browser application to display content from the first password protected website in response to the detection of the further input indicating the selection of the first password protected website.

4. The system of claim 1, wherein the input is an indication of a user resource locator (URL) link to the first password protected website.

5. The system of claim 1, wherein the processor further executes or facilitates the execution of the instructions to cause the system to store the URL link as a stored URL link in a data store that stores the master account data and store the username and the password as the encrypted access data in the data store.

6. The system of claim 1, wherein the processor further executes or facilitates the execution of the instructions to cause the system to, in response to the authentication of the identity utilizing the master username and the master password, enable viewing of the stored URL link, the username and the password.

7. The system of claim 1, wherein the processor further executes or facilitates the execution of the instructions to cause the system to, in response to the authentication of the identity utilizing the master username and the master password, enable the stored URL link, the username and the password to be modified.

8. The system of claim 1, wherein the processor further executes or facilitates the execution of the instructions to cause the system to determine the structure of login forms for the first password protected website.

9. A method, comprising:
    in response to authenticating identity data based on a master name and a master password of a master account that is represented by master account data stored in a data store and associated with an identity represented by the identity data, enabling, by a device comprising a processor, access from the device to a password protected network resource associated with the master account based on an encryption key that is derived from the master name and the master password;
    determining a structure of a login form for the password protected network resource in connection with an initial request for access to the password protected network resource;
    receiving a name and a password that are associated with the password protected network resource; and
    encrypting the name and the password that are associated with the password protected network resource using the encryption key resulting in encrypted resource access data for the password protected network resource stored in a data store in association with the master account,
    wherein the determining the structure of the login form for the password protected network resource comprises executing a script by a web browser of the device to determine the structure of the login form at a defined location for content represented by the password protected network resource, and wherein the defined location for content is root or home content of hierarchically defined content for the password protected network resource.

10. The method of claim 9, wherein the determining the structure of the login form for the password protected network resource comprises requesting and receiving a markup language file representing root or home content for the password protected network resource.

11. The method of claim 9, wherein the determining the structure of the login form for the password protected network resource comprises executing a script that requests the password protected network resource to provide a markup language file representing the login form for the password protected network resource.

12. The method of claim 9, wherein the determining the structure of the login form for the password protected network resource comprises determining the structure in response to the initial request for access to the password protected network resource.

13. The method of claim 9, further comprising:
storing the structure of the login form in association with the encrypted resource access data for the password protected network resource stored in the data store.

14. The method of claim 9, further comprising:
in response to a subsequent request for access to the password protected network resource, accessing the password protected network resource on behalf of the identity using the name and the password by decrypting the encrypted resource access data.

15. A computer readable storage device comprising computer executable instructions that, in response to execution, cause a device comprising a processor to perform operations, comprising:
in response to authenticating identity data based on a master name and a master password of a master account that is represented by master account data stored in a data store and associated with an identity represented by the identity data, enabling access for the device to a password protected network site associated with the master account based on an encryption key that is derived from the master name and the master password, wherein the authenticating the identity data comprises performing an additional authentication to authenticate the identity other than verifying the master name and the master password of the master account;
determining a structure of a login form for the password protected network site in connection with an initial request for access to the password protected network site;
receiving a name and a password that are associated with the password protected network site; and
encrypting the name and the password that are associated with the password protected network site using the encryption key resulting in encrypted site access data for the password protected network site stored in a data store in association with the master account,
wherein the additional authentication comprises verifying that text displayed by a web browser of the device is equivalent to a uniform resource identifier (URI) associated with the master account and presenting a warning not to enter the master name and the master password in response to the text being determined to be different from the URI associated with the master account.

16. The computer readable storage device of claim 15, wherein the additional authentication comprises at least one of verifying fingerprint identification data received from the identity, verifying the identity using a secure sockets layer protocol, or verifying that text displayed by a web browser of the device is equivalent to the uniform resource identifier (URI) associated with the master account.

* * * * *